United States Patent [19]
Richard et al.

[11] Patent Number: 5,518,105
[45] Date of Patent: May 21, 1996

[54] PROCESS AND DEVICE FOR CONVEYING OBJECTS ALONG A CIRCUIT AND USE THEREOF

[75] Inventors: Gilles Richard, Collonge-Fort-l'Ecluse; Bernard Vidonne, Cruseilles, both of France

[73] Assignee: Jean Gallay S.A., Plan-Les-Ouates, Switzerland

[21] Appl. No.: 244,808

[22] PCT Filed: Oct. 22, 1993

[86] PCT No.: PCT/CH93/00249

§ 371 Date: Jun. 9, 1994

§ 102(e) Date: Jun. 9, 1994

[87] PCT Pub. No.: WO94/10072

PCT Pub. Date: May 11, 1994

[30] Foreign Application Priority Data

Oct. 23, 1992 [FR] France ................................ 92 12699

[51] Int. Cl.[6] .................................................. B65G 47/26
[52] U.S. Cl. .................. 198/459.1; 198/458; 198/465.1; 198/432
[58] Field of Search ................... 198/418.7, 429, 198/432, 458, 459.1, 465.1, 468.3, 468.4

[56] References Cited

U.S. PATENT DOCUMENTS

| | | | |
|---|---|---|---|
| 3,887,060 | 6/1975 | Kamphues | 198/458 X |
| 3,987,889 | 10/1976 | Godoy | 198/459.1 X |
| 4,197,073 | 4/1980 | Rees et al. . | |
| 4,536,118 | 8/1985 | Baba | 198/458 X |
| 4,694,951 | 9/1987 | Gibbemeyer . | |
| 5,012,917 | 5/1991 | Gilbert et al. | 198/465.1 X |
| 5,074,401 | 12/1991 | Morita et al. | 198/465.1 |
| 5,090,555 | 2/1992 | Kura | 198/465.1 |
| 5,391,214 | 2/1995 | Nakagawa | 198/432 X |

FOREIGN PATENT DOCUMENTS

| | | | |
|---|---|---|---|
| 0075531 | 3/1983 | European Pat. Off. . | |
| 0264781 | 4/1988 | European Pat. Off. . | |
| 2446785 | 9/1980 | France | 198/458 |
| 2665147 | 1/1992 | France | 198/418.7 |
| 2667051 | 3/1992 | France . | |
| 85/01718 | 4/1985 | WIPO . | |
| 92/05097 | 4/1992 | WIPO . | |

OTHER PUBLICATIONS

Patent Abstracts of Japan, vol. 7, No. 87 (P—190)(1232) 12 Apr. 1983 & JP, A, 58 014 341 (Pioneer) 27 Jan. 1983.

Primary Examiner—James R. Bidwell
Attorney, Agent, or Firm—Davis, Bujold & Streck

[57] ABSTRACT

Process and device for conveying objects on transport pallets along a circuit by altering the spacing (e, E) between the objects in order to pass through at least one work station (2, 3). The spacing is altered by longitudinally separating the pallets (4) in order to pass from a first interval, which can be non-existent, to a second interval (X) which can be adjusted. For this purpose, a station (7) is provided which laterally transfers groups of pallets (29, 39, 31, 32) between two sections of parallel tracks (5, 6). The groups are transversally separated stepwise by a ram (17), the pallets of a group (30) are then separated by engaging elements (22, 23) and driven together by a comb mechanism (26). Application in manufacturing, assembly or processing plants using pallet conveying mechanism, especially for the manufacture of containers blow-moulded from preforms.

15 Claims, 5 Drawing Sheets

PROCESS AND DEVICE FOR CONVEYING OBJECTS ALONG A CIRCUIT AND USE THEREOF

The present invention concerns a method for conveying objects along a circuit whereby each object is placed on a transport pallet and the pallets are moved in steps along the circuit to pass successively through a first work station where they are separated by a first longitudinal interval, and at least one second work station where the objects are separated by a second longitudinal interval, larger than the first interval, said method comprising the step of separating the objects between the first and the second work station.

The invention also concerns a device for moving the objects along a circuit consisting of transport pallets arranged in a line on sections of track forming at least one part of said circuit and successively passing through a loading station where each object is placed on a pallet, a first work station, at least one second work station where the objects are treated in batches, and a discharge station where the objects are removed from the pallets; at the first work station, the objects are separated by a first longitudinal interval and at the second work station, by a second longitudinal interval larger than the first interval. The device also comprises means for advancing the pallets in steps along the track. The invention also concerns a use for such a device: conveying preforms during the thermoplastic blow-molding process.

Conveying objects placed on individual pallets along a production line, assembly line or any type of treatment circuit is a common practice. The circuit is generally closed and the pallets are pushed in steps at a predetermined rhythm depending upon the time required to perform operations at the various posts along the line.

Such devices are typically used in production lines during the manufacture of thermoplastic containers blow-molded from preforms. The lines generally comprise a unit for loading the preforms onto the pallets, a preheating oven through which the preforms pass for whatever time is required to soften the material, a blow-molding station and a discharge station where the molded containers are removed from the pallets. The empty pallets then follow the return track that closes the circuit.

If it is necessary for the objects to remain immobile at one work station longer than at other work stations, that work station must treat several objects simultaneously to avoid slowing the rhythm of the line. This is particularly true with a blow-molding station as described above, which generally consists of two half-molds with several cavities that must be transversely separated for the pallets to be introduced, then closed for blow-molding, cooling, etc. to take place. Thus, if several objects are molded simultaneously, the pallets can move along the circuit at a higher speed.

Devices known in the art that function according to this principle require specialized equipment for temporarily storing the pallets before they are introduced as a batch into the mold while successive pallets continue to advance along the circuit. The spacing between successive objects presents a problem with this type of line. The interval should be as small as possible on the largest portion of the circuit, primarily to reduce excessive acceleration. Furthermore, the interval between objects should be as small as possible while they are passing through the preheating oven in order to control preheating time and reduce it. On the other hand, it is imperative that the interval be larger than a limit determined by the size of the object manufactured so that two successive objects do not touch each other. In actuality, the size of the molds imposes an even stricter limit, particularly when the molding station is designed to blow-mold several objects respectively transported on a group of aligned pallets.

One known solution for varying spacing between objects between two predetermined values (specifically in French Patent Application Publication No. FR-A-2 667 051) consists of using rectangular pallets and placing the pallets either longitudinally or transversely in the line of adjacent pallets traversing a given portion of the circuit. In the application cited above, the long sides of the pallets are adjacent when in the zone of the preheating oven, therefore the objects are closely spaced and remain in this zone for a long time, and the short sides of the pallets are adjacent when in the molding station and the discharge station, therefore the objects are widely spaced apart. There are two possible methods for switching from the first to second spacing and vice-versa. The simplest consists of forming a right-angle turn on the pallet circuit, but not changing the orientation of the pallets as they turn. This is an inconvenient arrangement on a production line, since the oven and the molding station must be disposed perpendicular to each other. The other solution consists of causing each pallet to effect a one-quarter turn without changing direction, but this requires a delicate mechanism capable of separating each pallet from the successive one so it can pivot freely and still maintain the rapid rhythm of pallet progression. Furthermore, rectangular pallets are poorly adapted to manufacturing of objects of varying sizes and therefore demand different spacing intervals; furthermore, pallet length, certain track dimensions, longitudinal pallet advancement, etc. must change for each different size of objects manufactured.

U.S. Pat. No. 4,197,073 describes a molding unit comprising a preform injection station and a preform blow-molding station for manufacturing bottles. Eight preforms are transported together from one station to the other by a bidirectional conveyor consisting of four double supports placed together on diverging rails to be spaced beside the blow-molding station, where the preforms are removed by an extraction device. The supports analogous to the pallets simply effect the forward and backward motion along the rails without transferring them from one conveyor to another. The preforms do not advance to a work station while they remain on the supports, that is, this is not a pallet transport circuit.

The aim of the present invention is to propose a method and device for easily varying the spacing between objects transported on pallets. A specific aim of the invention is to facilitate the use of non-rectangular pallets on such a device. Another specific aim of the invention is to facilitate adjustment of the larger interval to adapt to the various sizes of objects transported.

To achieve this, the method according to the invention is characterized in that the first spacing is defined by a first interval between pallets and said second spacing is defined by a second interval, larger than the first, between pallets, and in that during the separation phase, a group of pallets separated by the first interval is transversely displaced and the pallets in this group are longitudinally separated, forming the second interval between them, and then the pallets thus spaced apart are introduced into the second work station.

Thus, the second interval between pallets does not depend upon pallet size and can be adjusted at will, or more specifically, as a function of mold size. It is not necessary to change pallet orientation, even within a closed circuit, and furthermore, square or round pallets can be used. The first and second work stations can face in the same direction with only a small transverse separation resulting from the transverse displacement between pallets. If the pallets must be separated by a larger interval, this can be accomplished gradually after first transversely displacing them so successive pallets can arrive, that is, it is not necessary to slow the line for this arrival.

In a particularly advantageous form of the method, said first interval is nil and the pallets are adjacent.

Said transverse displacement is preferably a horizontal displacement between two parallel sections of the circuit. On the other side of the second work station, it is possible to reposition the pallets and re-establish the first interval between them.

In a first specific example of the method, the pallets in said group are transversely displaced and in the second instance, they are separated, resulting in said second interval.

In another specific example of the method, the pallets in said group are transversely displaced and longitudinally separated, resulting in the second interval, and these two operations are effected simultaneously on two adjacent groups.

In a preferred embodiment of the method of the invention, said objects consist of thermoplastic preforms for the manufacture of blow-molded containers, the second work station is a blow-molding station and the first work station is a preheating station which prepares the preforms for molding.

To carry out the method of the invention, a device according to the invention is characterized in that said first spacing is defined by a first interval between pallets and said second spacing is defined by a second interval, larger than the first, between pallets; in that the device comprises a transfer station designed to displace a group of pallets between a first and a second track section which are transversely separated from each other; and in that the transfer station comprises separating means designed to longitudinally separate the pallets in one group and create said second spacing interval.

Said first interval is preferably nil, with the pallets adjacent one another on the first track section.

In a preferred embodiment of the device, the first and the second track sections are parallel and at the same level at the transfer station, with the pallets transferred horizontally from one to the other. The transfer station may have a transverse ram which is applied laterally to a group of pallets aligned with the first track section and displaces this group toward the second section of track. The separation means may consist of movable engaging elements, each designed to engage one pallet in a group which is in alignment with the second section of track, and a separating devices designed to individually displace the engaging elements in the longitudinal direction of the second section of track, on a course which is respectively proportional to the distance between each engaging element and a reference point.

The drive means may comprise at least two longitudinal comb mechanisms disposed along the second section of track and designed to each engage a group of pallets and move it from the transfer station to the second work station, and from there to the discharge station with both comb mechanisms moving synchronously.

The circuit may comprise a return track which is parallel to the first and second track sections, but lower, while the stations which load and receive the objects removed from the pallets may be located above the return track.

The first and second track sections are preferably connected to the return track by transfer trolleys which each transport a group of pallets consisting of the same number of pallets as are in the groups treated at the transfer station.

Other advantageous characteristics of the invention will be apparent from the following description of one exemplary embodiment, with reference to the attached drawings, wherein.

Figure 1:
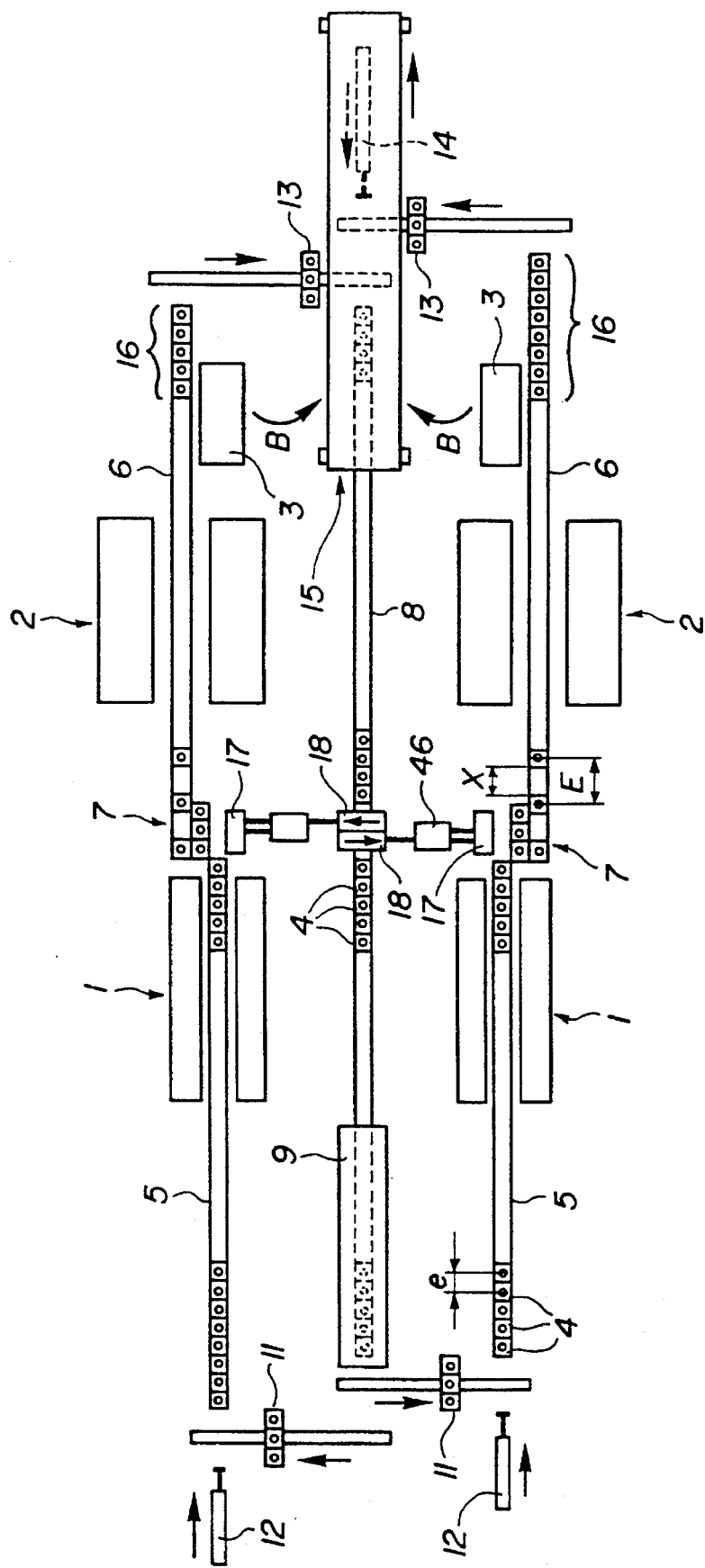
FIG. 1 is a schematic drawing of the entire unit for the manufacture of thermoplastic containers from preforms using standard blow-molding techniques, comprising a device according to the invention which moves the preforms and the containers on individual pallets.

The arrangement shown in FIG. 1 comprises two identical parallel lines for manufacturing thermoplastic containers, such as bottles, from previously injection molded preforms. Each line comprises a pre-heating oven 1, a molding station 2 and a discharge station 3 and is traversed by pallets 4 circulating on a closed circuit conveyor. On each line the device consists of a first track section 5 passing through oven 1, a second track section 6 passing through molding station 2 and discharge station 3, and a transfer station which moves groups of three pallets from the first section 5 to the second section 6. In the two closed circuits, pallets 4 are returned along a return track 8 common to both and at a lower level than sections 5 and 6, thereby reducing the size of the unit, as will become apparent later. A loading station 9 placed on return section 8 receives the preforms by known means and deposits one on each pallet 4. At the end of return section 8 the pallets are transversely transferred to the beginning of first section 5 of each line by means of an ascending trolley 11 which transports groups of three pallets at once. Thereafter, cylinder 12 pushes these pallets forward, and advances the pallets, which are adjacent one another on section 5, in steps equal to three pallet lengths. Likewise, section 6 of each line is followed by a descending trolley 13 which transports a group of three pallets to the beginning of return track 8. At this point a return cylinder 14 pushes all the pallets on the two trolleys 13 and on section 8 and advances them in steps equal to six pallets lengths. Thus, trolleys 11 and 13 and cylinders 12 and 14 all function at the same cadence. Loading station 9 may operate at the same cadence if it is designed to load six pallets at once. The same cadence prevails at stations 2 and 3 and on each of the two sections 6, where the pallets are advanced by a drive mechanism described below. Since return track 8 is on a lower level, receiving station 15 may be positioned above it. This station receives containers from the two discharge stations 3, as indicated by arrows B. As a result, the horizontal expanse of the unit is reduced and the manufactured containers can regroup immediately on the two lines in preparation for storage. Furthermore, station 15 is aligned with station 9 and located only a small distance from it, thereby reducing the total size of the unit.

Because pallets 4 move forward in longitudinal steps along circuit sections 5 and 8 and along a terminal zone 16 of each section 6, there is a first interval (spacing) e between them which is minimal and corresponds to one pallet length, the interval between two pallets being nil. This spacing is determined by the minimal spacing between preforms in preheating oven 1.

Transfer station 7 is designed to modify this spacing by separating pallets 4 from one another so they are separated by second interval (spacing) E on section 6 when passing through molding station 2 and discharge station 3. For this reason, two consecutive pallets in the same group are separated by interval (distance) X. This operation takes place in combination with the transverse displacement of pallets in groups of three by means of a transverse ram 17 actuated by a cylinder 18 between each thrust of cylinder 12, when the pallets are stopped on circuit sections 5 and 6.

Figure 2:
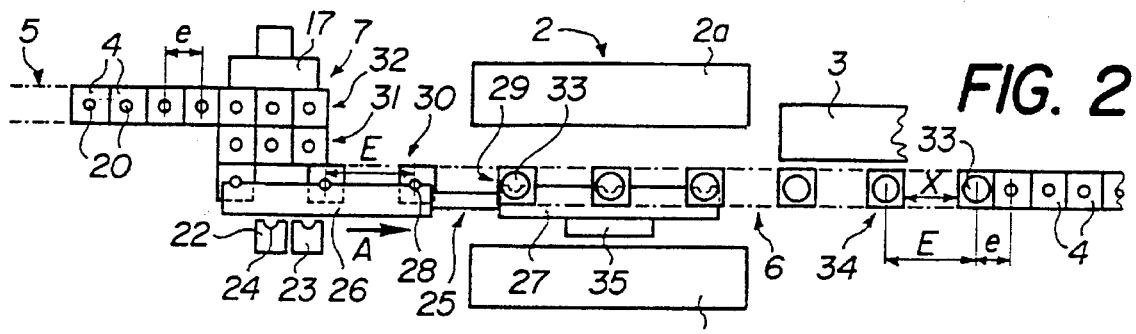
FIGS. 2 through 6 are schematic plan views illustrating various phases of one cycle of the transfer station and the molding station in the device of FIG. 1.

The principal elements for displacing pallets 4 at transfer station and molding station 2, as well as the principle on which they function, are illustrated by FIGS. 2 through 6, where reference numerals 2a and 2b denote the two halves of a mold of known type which separate to allow the pallets to pass through, as well as the preforms and containers carried by the pallets. Transfer station 7 is provided with two movable engaging elements 22 and 23, each with a frontal notch which cooperates with a lower protrusion on each pallet 4 to position the pallet. In addition, there is a longitudinal drive mechanism 25 with two comb mechanisms 26 and 27 each having three notches 28 which engage the pallets. This mechanism is also movable in two perpendicular directions so it can engage groups of three pallets and advance them along second section 6 (FIG. 1) and transfer them from station 7 to station 2, then from station 2 to station 3. The groups of three pallets are displaced in the following sequence:

In the position shown in FIG. 2, transfer station 7 is occupied by three groups 30, 31 and 32 of three pallets holding preforms. The pallets in group 30 are already spaced by second interval E, while those in groups 31 and 32 still are spaced by first interval e (the nil interval between pallets), with the pallets being in longitudinal abutment. In addition, another group 29 of three pallets is at the molding station 2 and carries three bottles 33 that have just been blow-molded and released by opening mold sections 2a and 2b. Another group 34 of three pallets is located at discharge station 3 and is separated by second interval E, while pallets 4 located beyond station 3 on section 6 are again adjacent and separated by first interval e. From this position, drive mechanism 25 advances in the direction of arrow A, driven by device 35 which may be located beneath it. As a result of this, pallet group 29 is transferred from station 2 to station 3 by means of comb mechanism 27 and pallet group 30 is transferred from station 7 to station 2 by means of comb mechanism 26. The pallets in group 34 were previously pushed forward by a cylinder system on the lower portion which moved them together, placing them in abutment, while pushing forward all the pallets 4 which preceded them on section 6.

Figure 3:
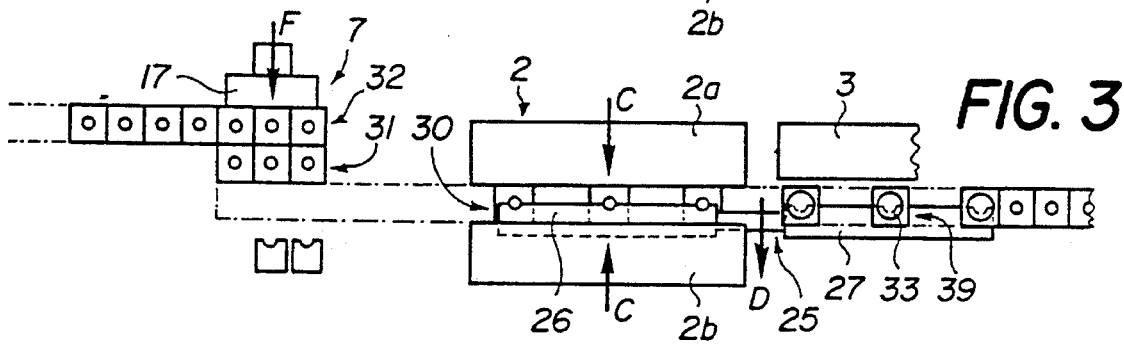
Figure 4:
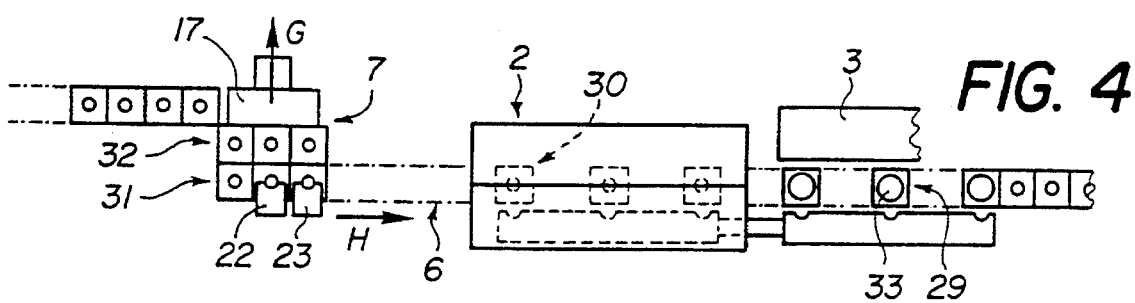

FIG. 3 shows the position attained at this point. The blow-molded containers 33 can continue to cool at station 3 where appropriate clamps (not shown) are activated to grip the containers. At station 2 mold sections 2a and 2b begin to close over the preforms in the direction of arrows C. In addition, mechanism 25 is displaced transversely in the direction of arrow D to disengage from the pallets. During this period ram 17 on transfer station 7 is activated in the direction of arrow F in order to transversely displace pallet groups 31 and 32 into the position shown in FIG. 4.

Figure 5:
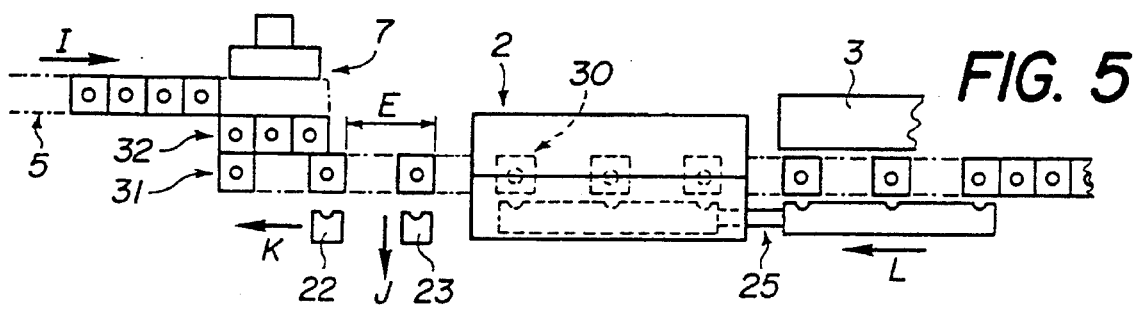
Figure 6:
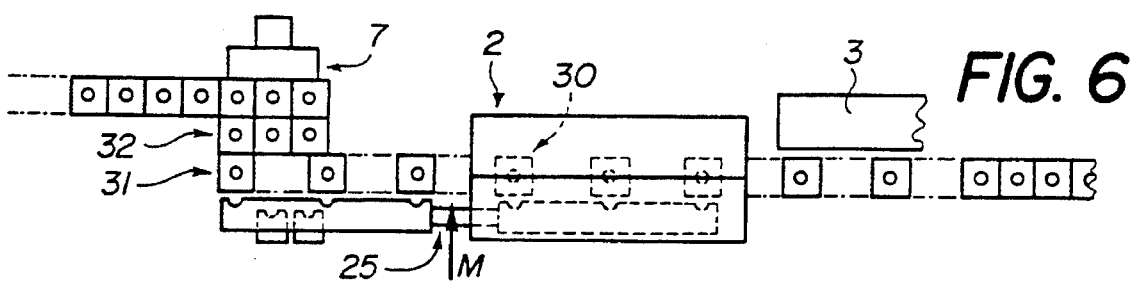

The pallets in group 31 are thus aligned with track section 6; two of them are retained by engaging elements 22 and 23 and the third by an element which is not shown. The pallets in group 32 occupy an intermediate position between sections 5 and 6. At this stage, bottles 33 are removed from the pallets at station 3. Ram 17 withdraws according to arrow G, while engaging elements 22 and 23 advance in the direction of arrow H and separate the pallets in group 31 by the second interval E, as shown in FIG. 5.

Cylinder 12 is activated at this stage (see FIG. 1) and advances the pallets on section 5 in the direction of arrow I to introduce three new pallets into transfer station 7. Engaging elements 22 and 23 have withdrawn, as shown by arrow J, and revert to their initial position shown by arrow K. During this period the containers from pallet group 30 are undergoing blow-molding at molding station 2. At the same time, since the teeth of mechanism 25 have disengaged from the pallets, it completes the return cycle to resume its initial position shown in FIG. 6, from which point it can be displaced transversely according to arrow L in order for teeth 27 and 26 to engage pallet groups 30 and 31, respectively, as shown in FIG. 2.

Figure 7:
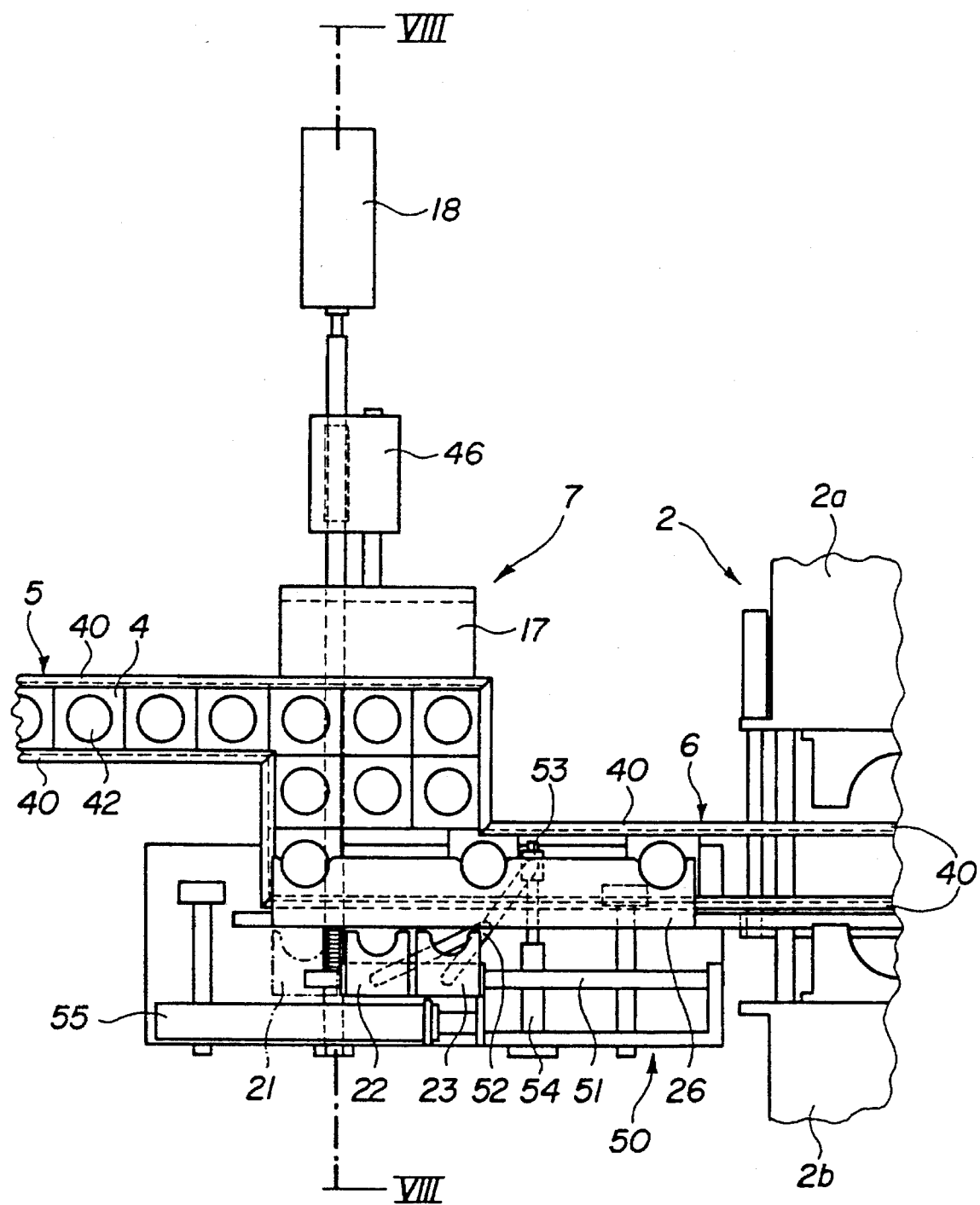
FIG. 7 is a plan view showing more detail of the transfer station.
Figure 8:
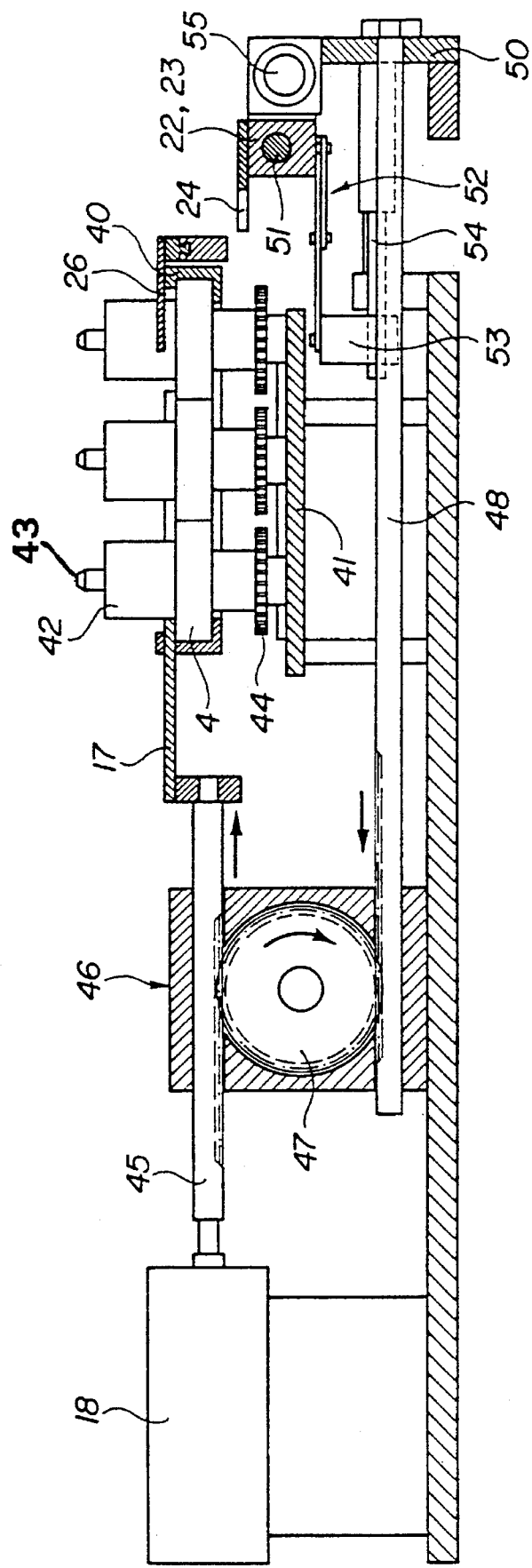
FIG. 8 is a schematic cross-section taken along lines VIII—VIII of FIG. 7.

FIGS. 7 and 8 show more detail of the construction of transfer station 7 between track sections 5 and 6. In this example the sections consist of pairs of lateral rails 40 which support and guide the pallet edges, which are supplementally supported by a horizontal plate 41 (FIG. 8) at the transfer station. The pallets 4 shown here are a type currently used and consist of a wooden plate supporting a cylindrical base 42 in which there is a pivoting central element with an uppermost holder 43 for the preform mouths, and of a lower pinion 44 which rotates the performs while they are in the preheating oven. However, the device described here is adaptable to any other type of pallet.

Ram 17 is driven by the hydraulic or pneumatic cylinder 18 by means of a rack and pinion shaft 45 traversing device 46 with gear 47 which strikes another horizontal shaft 48 with a rack and pinion. Shaft 48 is designed to drive a movable chassis which supports engaging elements 22 and 23 synchronously and in opposition to ram 17. These elements slide along a bar 51 and are connected to an articulated rod system 52 connected to a block 53 which slides transversely along a guide 54. Rod system 52 is designed so that the path of separating element 22 is half that of element 23, which is driven by longitudinal pneumatic cylinder 55. The course can be adjusted if necessary in order to modify interval E.

Comb elements 26 and 27 of drive mechanism 25 are located immediately above guide rails 40 and cooperate with pallet bases 42 but do not interfere with engaging elements 22 and 23 in transfer station 7. Depending upon the situation, the play between engaging elements 22 and 23 may be completed by a first element 21 affixed to guide bar 51 and which is displaced only transversely in relation to the pallets so it can receive the last pallet in a group and maintain it in place while the others are separated.

Figure 9:
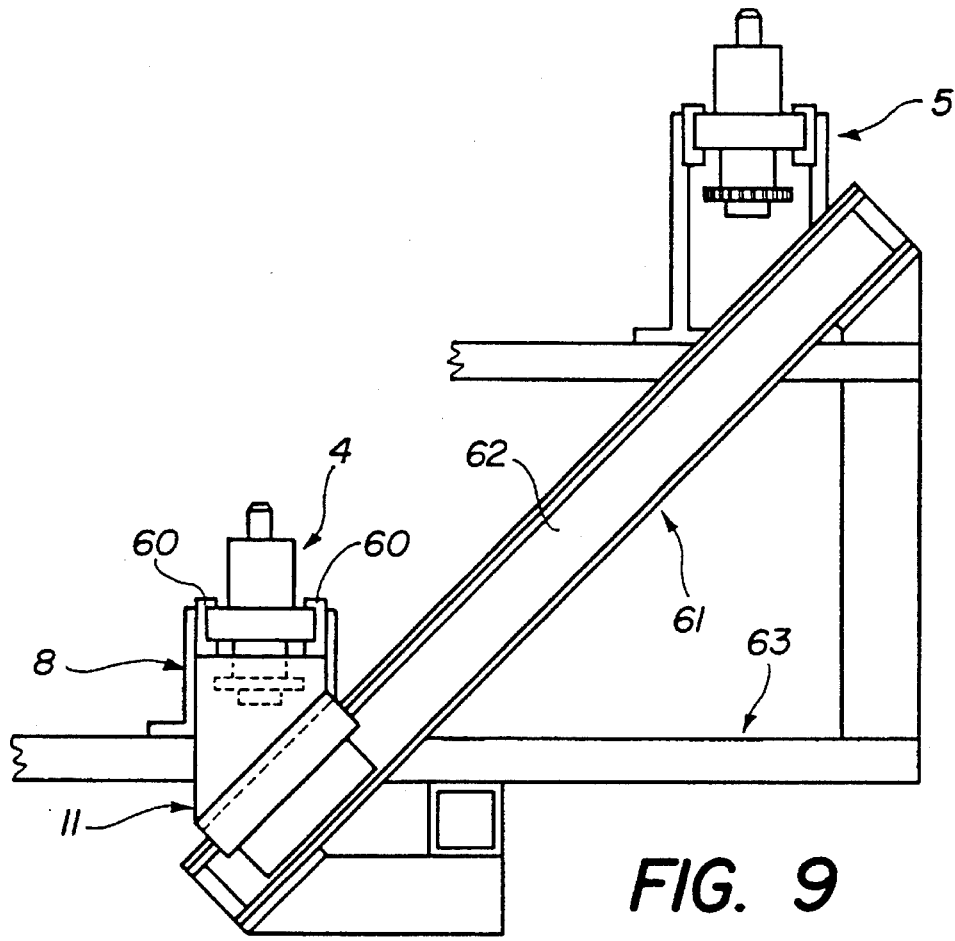
FIGS. 9 and 10 show a frontal elevation and a plan view, respectively, of one of the four transfer trolleys provided at the extremities of the unit of FIG. 1.
Figure 10:
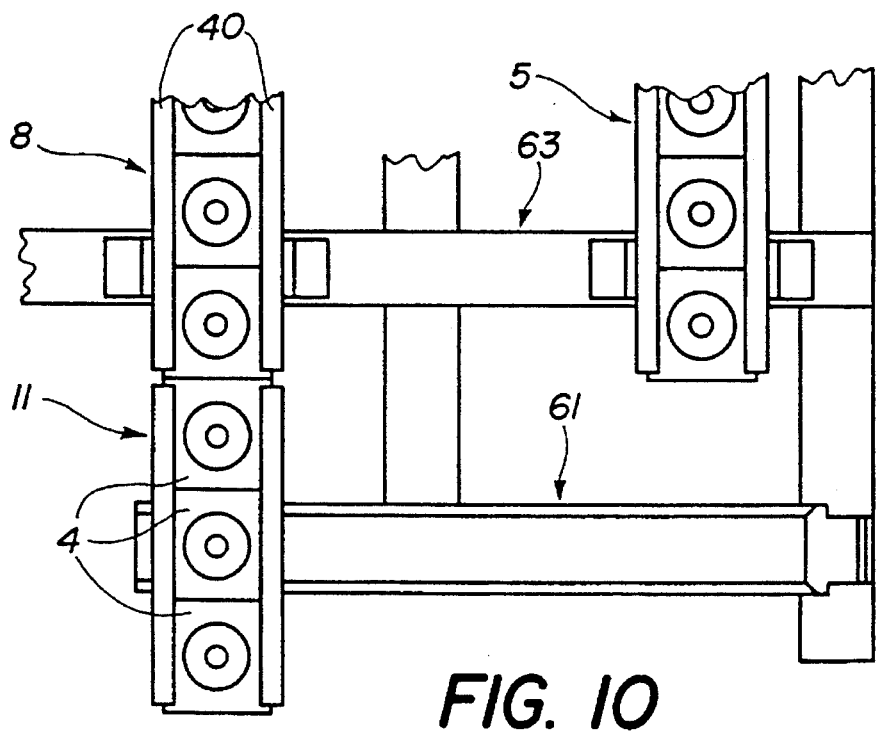

FIGS. 9 and 10 illustrate schematically the construction of ascending trolley 11 which moves groups of three pallets 4 from section 8 to section 5 on the conveyor circuit. Trolley 11 supports pallets 4 by means of two lateral rails 60 similar to rails 40 on circuits 8 and 5. It has an inclined base which overlaps a rail 61 that supports and guides it using bearings. At the same time, rail 61 contains a pneumatic cylinder (not shown) of the type having a piston affixed to two endless strips, each of which runs along an exterior surface 62 of rail 61 where it is attached to trolley 11 and drives it in two directions. Rail 61 is simply mounted on structure 63 supporting conveyor circuit sections 5 and 8. This is a simple device which has proven very effective and capable of transferring pallets at high speed, despite the fact that sections 5 and 8 are at different levels. The type of cylinder known as a "shaftless cylinder" may of course be replaced by any other known cylinder or by a chain or a cable mechanism functioning in the same way. Ascending and descending trolleys 11 and 13, along with rails 61, comprise the mechanisms which raise and lower the pallets, moving them from one portion of the circuit to the other, to the return track and and back, while the bi-level arrangement of these two portions conserves space. This design is especially advantageous because it reduces the size of the production circuit and occupies relatively little space below the track sections holding the ovens and the molds.

The present invention is not limited to the embodiment and the application described here, but may extend to any modification or variation evident to one skilled in the art. Another variation within the scope of the invention consists of a transfer station designed to separate the pallets in one group during transverse displacement, for example, using guides in a fan arrangement which cooperate with the lower pallet elements.

We claim:

1. A process for transporting objects along a circuit, wherein each object is placed upon a transport pallet (4) and the pallets are moved in steps along the circuit (5, 6, 8, 11, 13) to pass in succession through a first work station (1), where the objects are separated by a first longitudinal spacing (e), and at least one second work station (2, 3), where the objects are separated by a second longitudinal spacing (E), larger than the first spacing (e), said process comprising the step of:

separating the objects between the first work station and the second work station so that said first spacing of the objects is defined by a first distance between pallets and said second spacing of the objects is defined by a second distance (X) between pallets, larger than the first distance and, during the separating step, one group of pallets (29, 30, 31, 32, 34) separated by the first distance is transversely displaced and the pallets in this group are longitudinally separated to form the second distance between the pallets, and the pallets spaced by the second distance are then introduced into the second work station.

2. A process according to claim 1 further comprising the step of placing the pallets adjacent one another so that said first distance is substantially nil.

3. A process according to claim 1 further comprising the step of providing a horizontal displacement between two longitudinal parallel sections of track (5, 6) to facilitate the transverse displacement.

4. A process according to claim 1 further comprising the step of moving the pallets together to reestablish the first distance between pallets after the second work station.

5. A process according to claim 1 further comprising the step of transversely displacing the pallets in said group, during a first operation of a transfer station, and separating the pallets, during a second operation of the transfer station, thereby forming the second distance, with the first and second operations occurring substantially simultaneously for two adjacent groups of pallets.

6. A process according to claim 1 further comprising the steps of transversely displacing and longitudinally separating the pallets in said group to form said second distance with the transversely displacing and longitudinally separating operations occurring substantially simultaneously.

7. A process according to claim 1 further comprising the step of using thermoplastic preforms (20), for the manufacture of blow-molded containers (33), as the objects, using a preheating station to prepare the thermoplastic preforms (20) for molding as the first work station (1), and using a blow-molding station for the thermoplastic preforms (20) as the second work station (2).

8. A device for conveying objects along a circuit, said device comprising transport pallets (4) arranged in a line on sections of track (5, 6, 8) forming at least one portion of said circuit, a loading station (9) for placing each object (20) upon a pallet, a first work station (1) for treating the objects in groups and at least one second work station (2) for treating the objects in groups, and a discharge station (3) for removing the objects from the pallets, whereby the first work station separates the objects by a first longitudinal spacing (e) and the at least one second work station separates the objects by a second longitudinal spacing (E) greater than the first spacing (e), and said device further comprising drive means (12, 14, 25) advancing the pallets in steps along the sections of track (5, 6)

wherein the first spacing (e) is defined by a first distance between pallets and the second spacing (E) is defined by a second distance (X) between pallets, larger than the first distance, and the device further comprises a transfer station (7) which displaces a group of pallets (29, 30, 31, 32, 34) between first and second sections of track (5, 6) transversely separated from each other, and said transfer station (7) comprises engaging means (21, 22, 23, 50–55) which longitudinally separate the pallets in a group to create the second distance between pallets.

9. A device according to claim 8 wherein the first distance is nil with the pallets located adjacent one another on the section of track (5).

10. A device according to claim 8 wherein the first and the second sections of track (5, 6) are parallel to one another and, at the transfer station (7), are at the same level, and the pallets are transferred horizontally between the first and the second sections of track (5, 6).

11. A device according to claim 10 wherein the transfer station comprises a transverse ram (17) which travels laterally against a group of pallets aligned with the first section of track (5) and displaces this group toward the second section of track (6).

12. A device according to claim 11 wherein the transfer station further comprises separation means which comprises movable separating elements (22, 23) which each engage with one pallet of a group aligned with the second section of track (6), and a separating mechanism (52–55) which displaces the engaging means individually and longitudinally toward the second section of track (6), along a course which is respectively proportionate to the distance between each engaging element (22, 23) and a reference point (21).

13. A device according to claim 8 wherein the drive means comprises at least two longitudinal comb mechanisms (26, 27) disposed along the second section of track (6), each comb mechanism engages with a group of pallets (29, 30 31) to drive the group of pallets from the transfer station (7) to the second work station (2), and thereafter to the discharge station (30), and the two comb mechanisms are displaced substantially synchronously.

14. A device according to claim 10 wherein said device further comprises a return track (8), which extends parallel to the first and second sections of track (5, 6) but is located at a lower level, and a receiving station (15) for receiving the objects removed from the pallets, whereby the loading station (9) and the receiving station (15) are disposed above said return track (8).

15. A device according to claim 14 wherein the first and the second sections of track (5, 6) are connected to the return track (8) by transfer trolleys (11, 13) which each transport a group of pallets which comprise the same number of pallets as are in the groups treated at the transfer station (7).

* * * * *